July 25, 1967  L. L. KOSSAKOWSKI ET AL  3,333,105
DEVICE OF THE KIND IN WHICH THE DISTANCE OF AN
OBJECT FROM A DEFINED SURFACE IS DETERMINED
OR ADJUSTED BY MEANS OF A BRIDGE CIRCUIT
Filed April 23, 1964                                     2 Sheets-Sheet 1

INVENTOR.
LEONARD L. KOSSAKOWSKI
WILHELMUS B. ROSINK
BY
AGENT

INVENTOR.
LEONARD L. KOSSAKOWSKI
WILHELMUS B. ROSINK
BY
AGENT 3,333,105
DEVICE OF THE KIND IN WHICH THE DISTANCE OF AN OBJECT FROM A DEFINED SURFACE IS DETERMINED OR ADJUSTED BY MEANS OF A BRIDGE CIRCUIT
Leonard Leszek Kossakowski and Wilhelmus Bernardus Rosink, Emmasingel, Eindhoven, Netherlands, assignors to North American Philips Company, Inc., New York, N.Y., a corporation of Delaware
Filed Apr. 23, 1964, Ser. No. 362,152
Claims priority, application Netherlands, Apr. 26, 1963, 292,017
9 Claims. (Cl. 250—210)

ABSTRACT OF THE DISCLOSURE

A system is described for providing an output responsive to the position of an image with respect to a predetermined plane, e.g., whether the image is in front of, behind, or in the plane. A pair of first photoresistors are positioned on opposite sides of a gap in the plane, and are connected as separate arms of a first bridge circuit. A pair of second photoresistors are positioned on opposite sides of the gap behind the plane, and are connected as separate arms of a second bridge circuit. The bridges are connected in cascade, with a voltage source connected to one bridge and an output device connected to the other bridge. The system may be employed to automatically focus a camera.

---

The invention relates to a device for determining or adjusting the distance of an object from a defined surface. The device comprises a bridge circuit in which at least two branches have a variable impedance. The correct determination or adjustment of the distance is obtained when the bridge is in a state of equilibrium.

In a device known from American patent specification 2,618,209, in which an object is reproduced by an optical lens system on a sensitive plate, this object is held by means of a wire to be wound on a roller at an adjustable distance from the sensitive plate arranged in a camera. The roller is coupled through a worm-wormwheel transmission with the cursor of a variable resistor in a branch of the bridge. When the distance of the object from the plate is varied, the roller rotates and as a result the cursor of the variable resistor moves. The bridge, which initially was in a state of equilibrium, is then out of equilibrium. By moving the cursor of a variable resistor in a further branch of the bridge, the bridge is again moved to the state of equilibrium. The cursor of the last-mentioned resistor is seated on a shaft provided with a disc, the periphery of which engages a wormwheel coupled with the lens system. When the bridge is again in the state of equilibrium, the variation of the object distance and the concomitant variation of the place of the lens system are such, also by a suitable choice of the ratio between the bridge resistors, that the object is again reproduced sharply on the plate.

The known device has a few disadvantages. In the first place there must be a mechanical link between the object and plate. In the second place the bridge resistors must have values, the ratio of which is correlated to the focal distance of the lens system, to the object distance and to the image distance.

An object of this invention is to avoid these disadvantages. According to the invention a second bridge is connected in cascade with the first bridge. Each of the bridges is provided, in two adjacent branches, with a photo-sensitive resistor. The resistors are disposed so that the optical distance between the object and the photosensitive resistors in one bridge differs from that between the object and the photo-sensitive resistors in the other bridge.

According to a further aspect of the invention the supply voltage is connected to one bridge so that it is operative across the series combination of the photo-sensitive resistors in said bridge, and the output voltage of the first bridge is operative across the series combination of the photo-sensitive resistors in the second bridge.

The invention will be described with reference to the drawing, in which.

Figure 1:
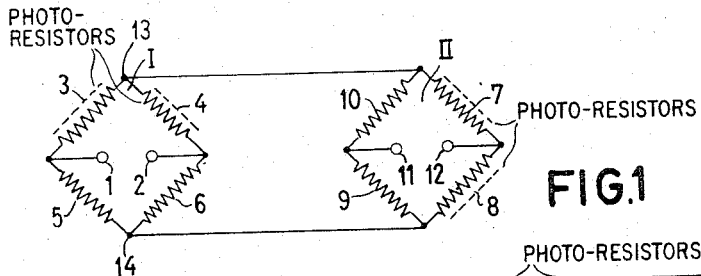
FIG. 1 is a circuit diagram of the interconnected bridge circuits employed in a device according to the invention.
Figure 2:
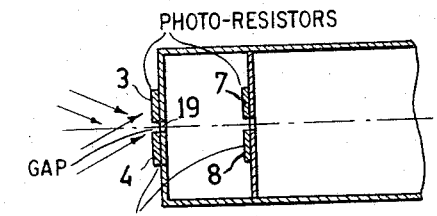
FIG. 2 shows diagrammatically the arrangement in space of the photo-resistors employed in the bridge circuit of FIG. 1.

Referring to FIGS. 1 and 2, reference numerals 3, 4 and 7, 8 designate two pairs of photo-resistors. Each pair is included in a Wheatstone bridge together with two fixed resistors 5, 6 and 9, 10 respectively. The direct voltage is applied between the terminals 1 and 2. When the photo-resistors 3 and 4 are exposed in an irregular manner to the light from the left (in FIG. 2) indicated by arrows, a voltage is produced at the output of the bridge I. The polarity of this voltage is determined, with a given polarity of the voltage between the terminals 1 and 2, by the difference in conductivity of the photo-resistors 3 and 4 in the case of equality of the resistors 5 and 6. The bridges I and II are connected in cascade, which means that the output voltage of the bridge I serves as a supply voltage for the bridge II. Bridge II includes the photo-resistors 7 and 8. It will be evident that a voltage appears at the terminals 11 and 12 only when with equality of the resistors 9 and 10 the photo-resistors 7 and 8 are unevenly illuminated. The photo-resistors 3 and 4 are arranged quite near a narrow gap 19, each on one side thereof, and the gap passes light striking the photo-resistors 7 and 8.

Figure 3A:
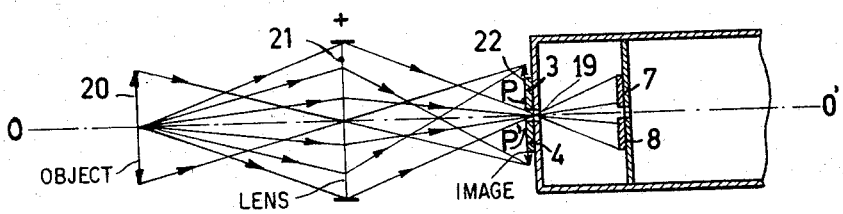
FIGS. 3a to 3c illustrate the light rays emanating from an object for three different spacings from the arrangement of FIG. 2.
Figure 3B:
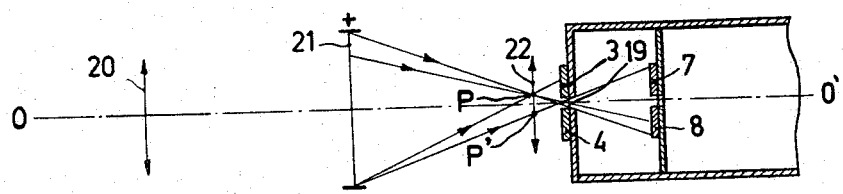
Figure 3C:
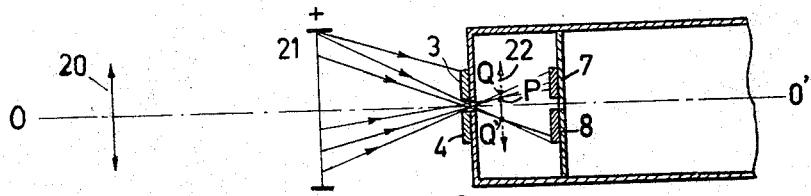

FIGS. 3a to 3c illustrate the course of rays from an object 20, the image 22 of which, formed by a positive lens 21, is shown in three different positions relative to the gap 19: FIG. 3a shows the image 22 coinciding with the gap 19; in FIG. 3b the image is located in front of the gap and in FIG. 3c it is located behind the gap.

In FIG. 3a the part of the image 22 formed by the lens 21 from the object 20 and located in the narrow gap 19 may be considered to be a point source. The light rays emitted by said point source strike the photo-resistors 7 and 8 in the same way. These resistors then have the same values, with the result that, independently of the quantities of light incident on the photo-resistors 3 and 4, the voltage between the terminals 11 and 12 is zero.

In FIG. 3b part of the light rays going through point P (of the image 22) strike either the photo-resistor 3 or the photo-resistor 8. The same applies to all points of the image 22 located above the axis 00′. In a similar manner part of the light rays considered to be emitted from the point P′ is incident either on the photo-resistor 4 or on the photo-resistor 7. It will be assumed that the quantity of light from P or from the part of the image 22 above the axis 00′ is greater than that emitted from P′ or the part of the image 22 beneath the axis 00′. The photo-resistor 3 or 8 respectively then receives a greater quantity of light than the photo-resistor 4 or 7 respectively, so that the value of the photo-resistor 3 is lower than that of the photo-resistor 4 and the value of the photo-resistor 8 is smaller than that of the photo-resistor 7. From FIG. 1 it will be apparent that the polarity of the voltage between the terminals 11 and 12 is the same as that of the voltage between the terminals 1 and 2. In other words, if the potential of the terminal 1 is positive with respect to the potential of the terminal 2, the potential of the terminal 11 will be positive with respect to the potential of the terminal 12.

When the brightness of the object 20 varies to an extent such that a greater quantity of light seems to emanate from point P' than from point P, the photo-resistor 3 will have a higher value than the photo-resistor 4, and the photo-resistor 8 will have a higher value than the photo-resistor 7. From FIG. 1 it will now appear that this brightness variation does not affect the polarity of the voltage between the terminals 11 and 12. Owing to the chosen combination of two bridges in accordance with the invention, the polarity of the output voltage is independent of light fluctuations of the object.

In FIG. 3c the image 22, reduced to the value QQ' is located behind the gap 19. The light rays which could contribute to the formation of point P are partly intercepted by the photo-resistor 3. The non-intercepted light rays strike the photo-resistor 7. In a similar manner part of the light rays susceptible to contribute to the formation of point P' of the image 22 is intercepted by the photo-resistor 4, while the non-intercepted light rays strike the photo-resistor 8. If the quantity of light contributing to P exceeds the quantity of light contributing to P', the photo-resistor 3 or 7 respectively has a lower value than the photo-resistor 4 or 8 respectively. From FIG. 1 it can now be easily inferred that the polarity of the voltage produced between the terminals 11 and 12 is opposite that of the voltage between the terminals 1 and 2. In other words, if the potential of the terminal 1 is positive relative to that of the terminal 2, the potential at terminal 11 will be negative relative to that at terminal 12. Also in this case said negative potential is maintained, in the event of brightness variation of the object 20: the polarity of the output voltage is again independent of the light fluctuations of the object.

From the foregoing it can be concluded that the output voltage of the series combination of the two bridges only depends upon the place of the gap 19 relative to the object. When the gap is displaced, or (which results in the same) when the object is displaced, the output voltage varies continuously from a positive value to a negative value or conversely.

This property of the device according to the invention may be utilised by arranging the circuit in a camera so that a zero output voltage of the cascade connection corresponds to a sharp image on the photographic film or plate.

Figure 4:
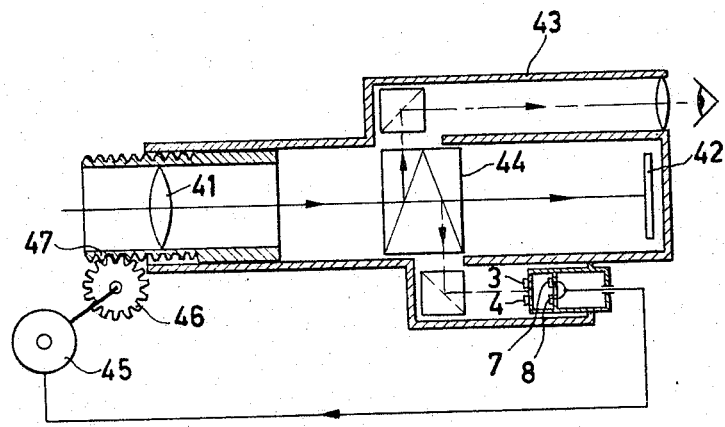
FIG. 4 shows diagrammatically a camera provided with an arrangement as shown in FIG. 1

FIG. 4 shows a simplified diagram of such a camera. The light incident through the lens 41 reaches for the major part the light-sensitive film 42. By means of the prism 44 part of the light is diverted to the finder 43, whereas a further part strikes the photo-sensitive resistors 3, 4 and 7, 8 respectively. These resistors are included in the bridge system shown in FIG. 1. The output voltage of this bridge system is supplied, if desired after amplification, to a motor 45. A pinion 46, seated on the shaft of the motor 45, engages a toothed rack 47, which holds the lens 41, which is automatically moved to the correct position relative to the sensitive layer 42.

As a matter of course, the output voltage of the bridge system may be transmitted in a different manner, for example so that the lens 41 is discontinuously displaceable.

A semi-automatic adjustment might be achieved so that the lens is moved manually to an extent such that the output voltage is zero, at which instant a shutter is released. The mechanism required to this end may at the same time serve to stretch the spring of the shutter.

In the case of poor contrast of the objects it is often desirable to cause the bridge system to perform slight reciprocating motions transverse to the optical axis, so that a sharp adjustment to the object of greater contrast close to the desired object can be obtained. It is furthermore possible to adjust to left-right contrast or top-bottom contrast by constructing the device comprising the bridge system so as to be rotatable about its optical axis.

Figure 5:
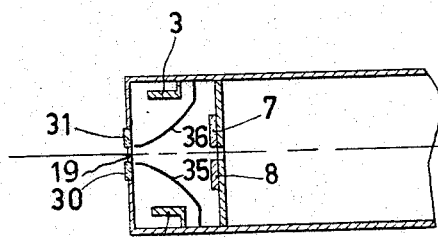
FIG. 5 shows a variation of the arrangement of FIG. 2.

FIG. 5 shows an arrangement in space of the photo-resistors 3 and 4 which is a modification of that of FIG. 4. On either side of the gap 19 there are arranged plates of frosted glass 30 and 31. The light passing through the frosted glass is diffused and strikes the photo-resistors 3 and 4. The light passing through the gap 19 can strike only the photo-resistors 7 and 8. Light-absorbing screens 35 and 36 separate the rays emanating from the frosted-glass plates and the light passing through the gap 19. The combination of frosted glass 30 and photo-resistor 4, or the frosted glass 31 and the photo-resistor 3 responds in the same manner to the light rays as the photo-sensitive resistor 4 or 3 respectively in the arrangement shown in FIG. 2. The considerations given with reference to FIG. 3 therefore also apply to the arrangement shown in FIG. 5.

It will be obvious that the device according to the invention may be arranged not only in cameras of the better type, but also in all arrangements intended to provide an accurate determination of distance.

What is claimed is:

1. A device for providing an output voltage responsive to the distance between an object and a predetermined plane, said device comprising a source of potential, a first bridge circuit having first and second adjacent arms comprising first and second photoresistive means respectively, a second bridge circuit having third and fourth adjacent arms comprising third and fourth photoresistive means respectively, means interconnecting one pair of opposite junctions of said first bridge circuit and one pair of opposite junctions of said second bridge circuit, optical means positioned in the path of light from said object to produce an image, means for positioning said first and second photoresistive means to receive light directed toward first and second regions respectively of said image, means responsive to the position of said image with respect to said plane for directing part of said directed light toward said third and fourth photoresistive means, whereby light from a given point on said object is intercepted only by said first and third photoresistive means when said distance exceeds a predetermined length and light from said given point is intercepted only by said first and fourth photoresistive means when said distance is less than said predetermined length, means connecting said source between the other opposite junctions of one of said bridge circuits, and output means connected to the other opposite junctions of the other bridge circuit.

2. A device for providing an output voltage responsive to the distance between an object and a predetermined plane, said device comprising a source of potential, a first bridge circuit having first and second adjacent arms comprising first and second photoresistive means respectively, a second bridge circuit having third and fourth adjacent arms comprising third and fourth photoresistive means respectively, means interconnecting one pair of opposite junctions of said first bridge circuit and one pair of opposite junctions of said second bridge circuit, optical means positioned in the path of light from said object to produce an image, means for positioning said first and second photoresistive means to receive light directed toward first and second regions respectively of said image, means responsive to the position of said image with respect to said plane for directing part of said directed light toward said third and fourth photoresistive means, whereby light from a first given point on said object is intercepted only by said first and third photoresistive means and light from a second given point on said object is intercepted only by said second and fourth photoresistive means when said distance exceeds a predetermined length, and light from said first given point is intercepted only by said first and fourth photoresistive means and light from said second given point is intercetped only by said second and third photoresistive means when said distance is less than said predetermined length, means connecting said source between the other opposite junctions of one of said bridge circuits and output means connected to the other opposite junctions of the other bridge circuit.

3. A device for providing an output voltage responsive to the distance between an object and a predetermined plane, said device comprising a source of potential, a first bridge circuit having first and second adjacent arms comprising first and second photoresistive means respectively, a second bridge circuit having third and fourth adjacent arms comprising third and fourth photoresistive means respectively, means interconnecting one pair of opposite junctions of said first bridge circuit and one pair of opposite junctions of said second bridge circuit, plate means having a gap and being disposed in said plane, optical means positioned to project an image of said object toward said plate means, means positioning said first and second photoresistive means for receiving light from opposite sides of said gap between said optical means and said plate means, means positioning said third and fourth photoresistive means for receiving light that passes through said gap on opposite sides of the axis of said gap, means connecting said source between the opposite junctions of one of said bridge circuits, and output means connected to the other opposite junctions of the other bridge circuit.

4. A device for providing an output voltage responsive to the distance between an object and a predetermined plane, said device comprising a source of potential, a first bridge circuit having first and second adjacent arms comprising first and second photoresistive means respectively, a second bridge circuit having third and fourth adjacent arms comprising third and fourth photoresistive means respectively, means interconnecting one pair of opposite junctions of said first bridge circuit and one pair of opposite junctions of said second bridge circuit, plate means having a gap and being disposed in said plane, lens means positioned for projecting an image of said object toward said plate means, means for mounting said first and second photoresistive means for receiving light intercepted by said plate means from said lens means on opposite sides of said gap, means mounting said third and fourth photoresistive means to receive light passing through said gap on opposite sides of the axis of said gap, means connecting said source between the other opposite junctions of one of said bridge circuits, and output means connected to the other opposite junctions of the other bridge circuit.

5. The device of claim 4, wherein said one pair of opposite junctions of one of said bridge includes a junction between adjacent arms having photoresistive means, and said one pair of opposite junctions of the other bridge circuit includes the junctions between said arms comprising photoresistive means and other arms thereof.

6. The device of claim 4, wherein said one pair of junctions of said one bridge circuit includes a junction between two arms having photoresistive means, and said other pair of junctions of said other bridge circuit includes a junction between two arms having photoresistive means.

7. A device of claim 4, comprising means for varying the distance between said lens means and said plane, and control means connected to said output means for controlling said means for varying said distance, whereby the position of said image is maintained with respect to said plane.

8. The device of claim 4, comprising means for oscillating said device about the optical axis.

9. The device of claim 4, comprising means for rotating said device about its optical axis.

References Cited
UNITED STATES PATENTS

| | | | |
|---|---|---|---|
| 2,999,436 | 9/1961 | Faulhaber | 88—1 |
| 3,005,913 | 10/1961 | Strong | 250—210 X |
| 3,035,176 | 5/1962 | Kis et al. | 250—210 |
| 3,041,459 | 6/1962 | Greene | 88—1 |
| 3,143,588 | 8/1964 | Donald et al. | 88—1 |
| 3,218,909 | 11/1965 | Fain | 250—203 |

RALPH G. NILSON, *Primary Examiner.*

M. A. LEAVITT, *Assistant Examiner.*